(12) United States Patent
Otomo et al.

(10) Patent No.: US 9,755,974 B2
(45) Date of Patent: Sep. 5, 2017

(54) COMMUNICATION DEVICE (71) Applicant: FUJITSU LIMITED, Kawasaki-shi, Kanagawa (JP)

(72) Inventors: Toshiya Otomo, Kawasaki (JP); Koichiro Yamashita, Hachioji (JP); Takahisa Suzuki, Yokohama (JP); Hiromasa Yamauchi, Usakos (NA); Koji Kurihara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 72 days.

(21) Appl. No.: 14/599,569

(22) Filed: Jan. 19, 2015

(65) Prior Publication Data

US 2015/0131439 A1 May 14, 2015

Related U.S. Application Data (63) Continuation of application No. PCT/JP2012/068566, filed on Jul. 23, 2012.

(51) Int. Cl.
*H04L 12/801* (2013.01)
*H04W 4/00* (2009.01)
*H04W 84/18* (2009.01)
*H04L 29/08* (2006.01)

(52) U.S. Cl.
CPC ............ *H04L 47/12* (2013.01); *H04W 4/006* (2013.01); *H04L 67/12* (2013.01); *H04W 84/18* (2013.01)

(58) Field of Classification Search
CPC ..................................................... H04L 47/12
See application file for complete search history.

(56) References Cited

U.S. PATENT DOCUMENTS

| 2009/0058634 | A1 | 3/2009 | Maltseff et al. | |
|---|---|---|---|---|
| 2010/0054183 | A1* | 3/2010 | Shin | H04L 45/02 370/328 |
| 2013/0243009 | A1* | 9/2013 | Andrews | H04L 49/00 370/429 |

FOREIGN PATENT DOCUMENTS

| JP | 6-164617 | 6/1994 |
|---|---|---|
| JP | 7-147586 | 6/1995 |
| JP | 2006-229845 | 8/2006 |
| JP | 2008-228179 | 9/2008 |
| JP | 2011-250106 | 12/2011 |
| KR | 20110137616 | 12/2011 |

OTHER PUBLICATIONS

EESR—Extended European Search Report of European Patent Application No. 12881540.4 dated Sep. 2, 2015.
(Continued)

*Primary Examiner* — Huy D Vu
*Assistant Examiner* — Teisha D Hall
(74) *Attorney, Agent, or Firm* — Fujitsu Patent Center (57) ABSTRACT

A communication device has: a sensor configured to output sensing data; a count signal communication part configured to count a count signal received from a control device directly or via another communication device and transmit the counted count signal and to store a value of the received count signal; and a data communication part configured to transmit the sensing data outputted by the sensor or the sensing data received from another communication device, in correspondence with the stored value of the count signal.

6 Claims, 7 Drawing Sheets

(56) References Cited

OTHER PUBLICATIONS

International Search Report and Written Opinion of the International Searching Authority (Form PCT/ISA/210, Form PCT/ISA/237), mailed in connection with PCT/JP2012/068566 and mailed Sep. 4, 2012 (7 pages), with partial English Translation.
"Taiwanese Office Action" mailed by Taiwanese Patent Office and corresponding to Taiwanese application No. 102121066 on Nov. 24, 2014, with partial English translation (5 pages).
JPOA—Office Action of Japanese Patent Application No. 2014-526622 dated Mar. 22, 2016, with English translation of the relevant part, p. 1, line 22 to p. 2, line 29 and p. 3 lines 18-20 of the Office Action.

* cited by examiner

COMMUNICATION DEVICE

CROSS-REFERENCE TO RELATED APPLICATION

This application is a continuation application of International Application PCT/JP2012/068566 filed on Jul. 23, 2012, and designated the U.S., the entire contents of which are incorporated herein by reference.

FIELD

The present invention relates to a communication device, a communication system, a control method of a communication device, and a program.

BACKGROUND

In a stackable hub which are made by connecting a plurality of hubs and functionally acts as one hub, a self-number setting system for hub is known (for example, see Patent Literature 1). That system has a hub number receiving means receiving the number of a hub in question from one of hubs cascade-coupled to that hub, a hub number adding means adding a predetermined value to the hub number having been received by the hub number receiving means, a self-number determining means determining the number obtained by the hub number adding means as a self number of that hub, a hub number transmitting means transmitting the self number to the other of cascade-coupled hubs, and a hub number initial value setting means making the number of the hub number receiving means be a constant value when there exists no hub connected to a hub number receiving means side.

Further, there is known an information reception confirmation system where a hierarchical star network that includes one host node and a plurality of lower nodes whose control lines are connected to each other is configured (for example, see Patent Literature 2). The host node has a means for transmitting communication information addressed to the plurality of lower nodes simultaneously. The lower node has a means for transmitting reception confirmation information when receiving the communication information.

Patent Literature 1: Japanese Laid-open Patent Publication No. 07-147586
Patent Literature 2: Japanese Laid-open Patent Publication No. 06-164617

When a plurality of communication devices perform communication unconditionally, congestion of communication sometimes occurs among the plurality of communication devices.

SUMMARY

A communication device has: a sensor configured to output sensing data; a count signal communication part configured to count a count signal received from a control device directly or via another communication device and transmit the counted count signal and to store a value of the received count signal; and a data communication part configured to transmit the sensing data outputted by the sensor or the sensing data received from another communication device, in correspondence with the stored value of the count signal.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
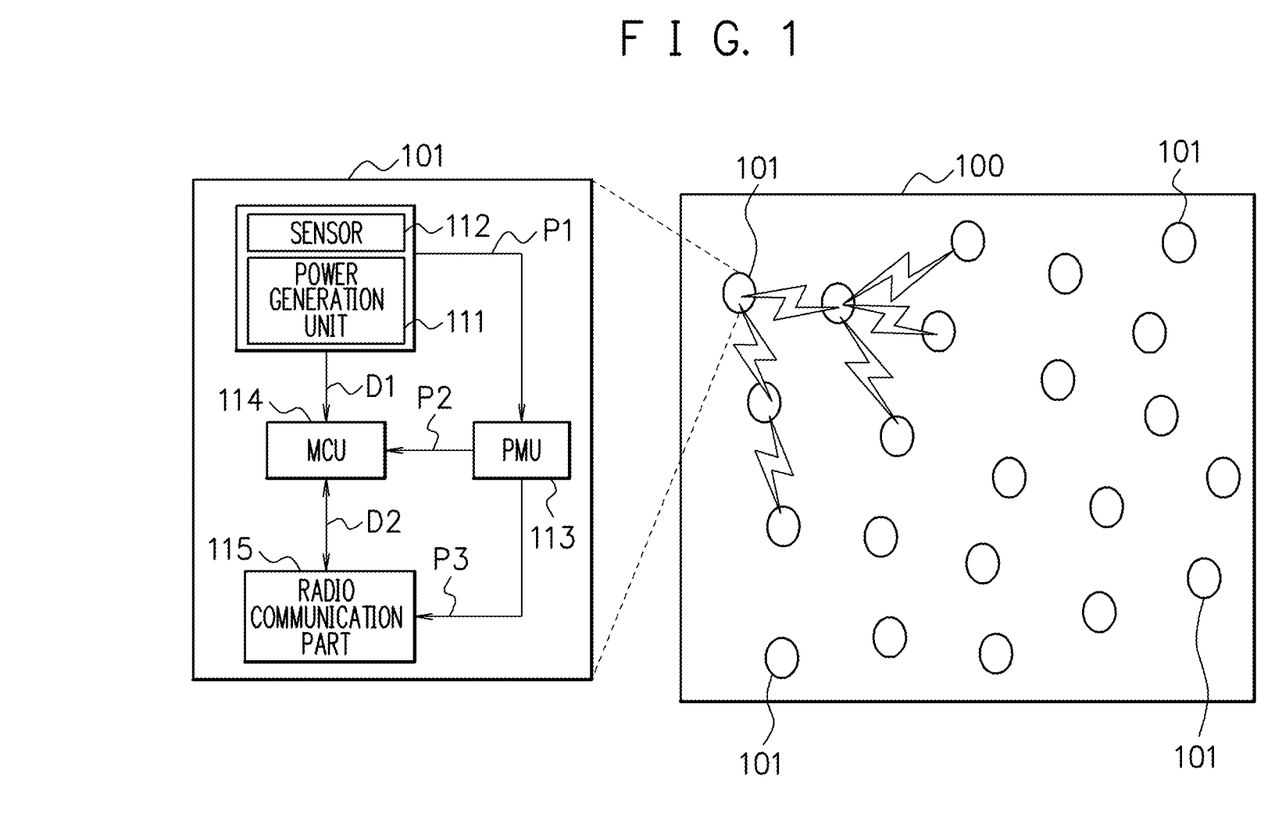
FIG. 1 is a diagram showing a configuration example of a communication system according to an embodiment.

FIG. 1 is a diagram showing a configuration example of a communication system 100 according to an embodiment. The communication system 100 has a plurality of communication devices 101. Each of the communication devices 101 has a power generation unit 111, a sensor 112, a power management unit (PMU) 113, a micro controller unit (MCU) 114, and a radio communication part 115.

The power generation unit 111 is an energy harvesting unit, for example, and converts natural energy into a power P1, outputting the power P1 to the PMU 113. Here, the natural energy is solar energy, radio wave energy of a cellular phone or the like, temperature difference energy, or the like.

The sensor 112 detects various sensing data D1 and outputs the sensing data D1 to the MCU 114. For example, the sensor 112 detects a pressure, detects a temperature, or detects a component or the like of a radio wave. Note that the sensor 112 can be one integrated with the power generation unit 111 or can be one separate from the power generation unit 111.

The PMU 113 inputs the power P1 supplied from the power generation unit 111, and manages a power P2 which is supplied to the MCU 114 and a power P3 which is supplied to the radio communication part 115. For example, when a predetermined condition is fulfilled, the PMU 113 supplies the powers P2 and P3 to the MCU 114 and the radio communication part 115, respectively.

The MCU 114 processes the sensing data D1 and outputs transmission data D2 to the radio communication part 115. For example, the MCU 114 performs a sampling processing of analog sensing data D1, to generate digital transmission data D2.

The radio communication part 115 converts the transmission data D2 into a high frequency signal, to radio-transmit to another communication device 101.

When the power generation unit 111 charges a predetermined power by power generation, the radio communication part 115 transmits the transmission data D2. Thereafter, the power generation unit 111 starts charging again, and when the predetermined power is charged, the radio communication part 115 transmits the transmission data D2. The above processing is repeated.

Further, it can be configured that the radio communication part 115 transmits the transmission data D2 when the radio communication part 115 receives a transmission request signal from the outside. Further, the MCU 114 may be configured to instruct the radio communication part 115 to transmit the transmission data D2 when a variation amount of the sensing data D1 becomes equal to or more than a threshold value.

Figure 2:
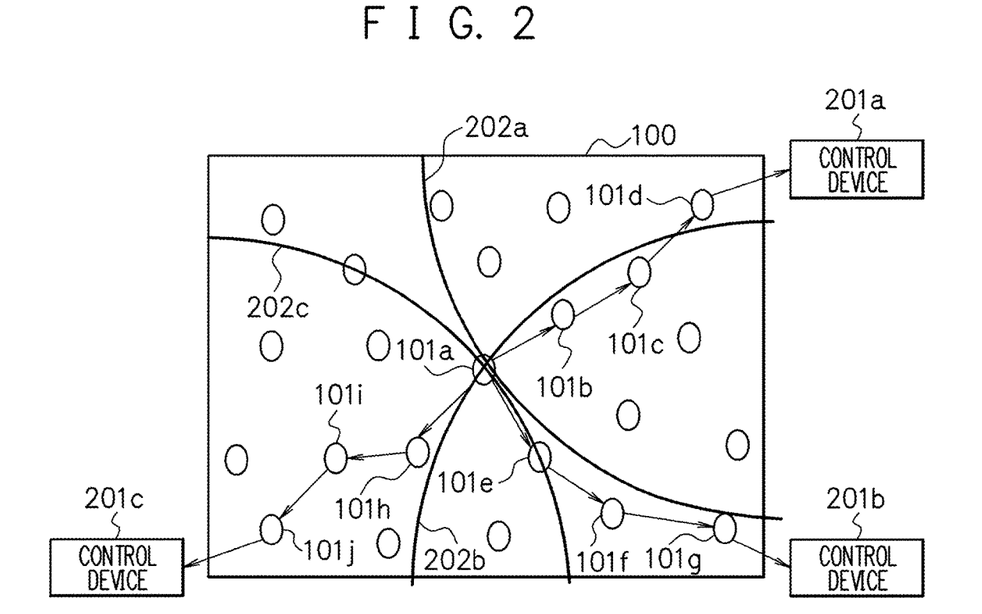
FIG. 2 is a diagram showing a configuration example of a communication system and a control device.

FIG. 2 is a diagram showing a configuration example of the communication system 100 and control devices 201a to 201c. The communication system 100 is a multihop communication system. A plurality of communication devices 101a to 101j correspond to the communication devices 101 of FIG. 1 and perform multihop communication. In other words, the plurality of communication devices 101 not only communicate with each other directly but also communicate via another communication device 101, whereby enabling communication with the communication devices 101 in a broad range.

Figure 8:
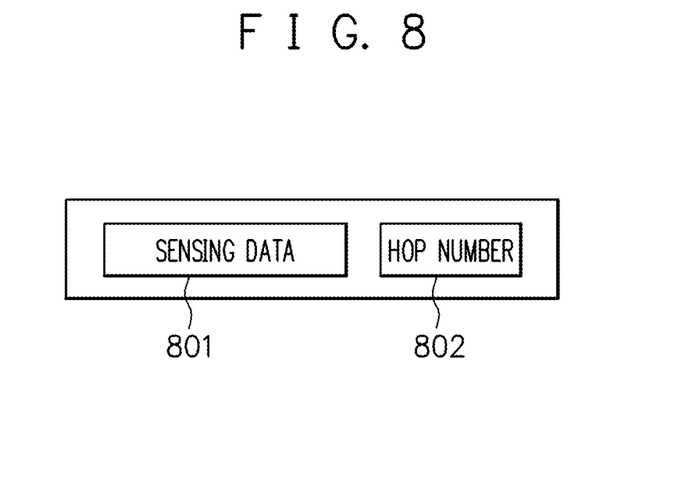
FIG. 8 is a diagram showing transmission data.

Since the communication device 101 has a small transmission power, the communication device 101 can communicate only with another communication device 101 in a narrow range. For example, an example in which the communication device 101a transmits the transmission data D2 to the control devices 201a to 201c will be described. The communication device 101a, as shown in FIG. 8, transmits sensing data 801 outputted by the sensor 112 together with a hop number 802 of an initial value "0". The communication devices 101b, 101e, and 101h exist in a communicable range of the communication device 101a. Therefore, the communication devices 101b, 101e, and 101h receive the sensing data and the hop number of "0" from the communication device 101a.

The communication device 101b increments the hop number of "0" received from the communication device 101a, whereby stores a hop number of "1" and transmits the sensing data received from the communication device 101a and the hop number of "1". Next, the communication device 101c positioned within a communicable range of the communication device 101b increments the hop number of "1" received from the communication device 101b, whereby stores a hop number of "2" and transmits the sensing data received from the communication device 101b and the hop number of "2". Next, the communication device 101d positioned within a communicable range of the communication device 101c increments the hop number of "2" received from the communication device 101c, whereby stores a hop number of "3" and transmits the sensing data received from the communication device 101c and the hop number of "3". Next, the control device 201a positioned within a communicable range of the communication device 101d receives the hop number of "3" and the sensing data from the communication device 101d. Thereby, the communication device 101a can radio-transmit the sensing data outputted by the sensor 112 to the first control device 201a via the communication devices 101b to 101d.

Similarly, the communication device 101e increments the hop number of "0" received from the communication device 101a, whereby stores a hop number of "1" and transmits the sensing data received from the communication device 101a and the hop number of "1". Next, the communication device 101f positioned within a communicable range of the communication device 101e increments the hop number of "1" received from the communication device 101e, whereby stores a hop number of "2" and transmits the sensing data received from the communication device 101e and the hop number of "2". Next, the communication device 101g positioned within a communicable range of the communication device 101f increments the hop number of "2" received from the communication device 101f, whereby stores a hop number of "3" and transmits the sensing data received from the communication device 101f and the hop number of "3". Next, the control device 201b positioned within a communicable range of the communication device 101g receives the hop number of "3" and the sensing data from the communication device 101g. Thereby, the communication device 101a can radio-transmit the sensing data outputted by the sensor 112 to the second control device 201b via the communication devices 101e to 101g.

Similarly, the communication device 101h increments the hop number of "0" received from the communication device 101a, whereby stores a hop number of "1" and transmits the sensing data received from the communication device 101a and the hop number of "1". Next, the communication device 101i positioned within a communicable range of the communication device 101h increments the hop number of "1" received from the communication device 101h, whereby stores a hop number of "2" and transmits the sensing data received from the communication device 101h and the hop number of "2". Next, the communication device 101j positioned within a communicable range of the communication device 101i increments the hop number of "2" received from the communication device 101i, whereby stores a hop number of "3" and transmits the sensing data received from the communication device 101i and the hop number of "3". Next, the control device 201c positioned within a communicable range of the communication device 101j receives the hop number of "3" and the sensing data from the communication device 101j. Thereby, the communication device 101a can radio-transmit the sensing data outputted by the sensor 112 to the third control device 201c via the communication devices 101h to 101j.

Next, there will be described a method for specifying the sensing data of which communication device 101 among the plurality of communication devices 101 the above-described control devices 201a to 201c have received. Since the first control device 201a has received the hop number of "3", it can be assumed that the first control device 201a has received the sensing data from the communication device 101 on a circle (sphere) 202a centering on the first control device 201a. Further, since the second control device 201b has received the hop number of "3", it can be assumed that the second control device 201b has received the sensing data from the communication device 101 on a circle (sphere) 202b centering on the second control device 201b. Further, since the third control device 201c has received the hop number of "3", it can be assumed that the third control device 201c has received the sensing data from the communication device 101 on a circle (sphere) 202c centering on the third control device 201c. Consequently, it can be judged that the control devices 201a to 201c have received the sensing data from the communication device 101a positioned at an intersection point of the three circles 202a to 202c.

When the plurality of communication devices 101 exist in the communicable range of the communication device 101a, the communication device 101a sometimes transmits the same sensing data to the control device 201b via a plurality of different paths. In such a case, it suffices that the control device 201b selects the sensing data of the smallest hop number among a plurality of pieces of received sensing data in determining the hop number. The same thing as with the control device 201b applies to the control devices 201a and 201c.

Figure 3:
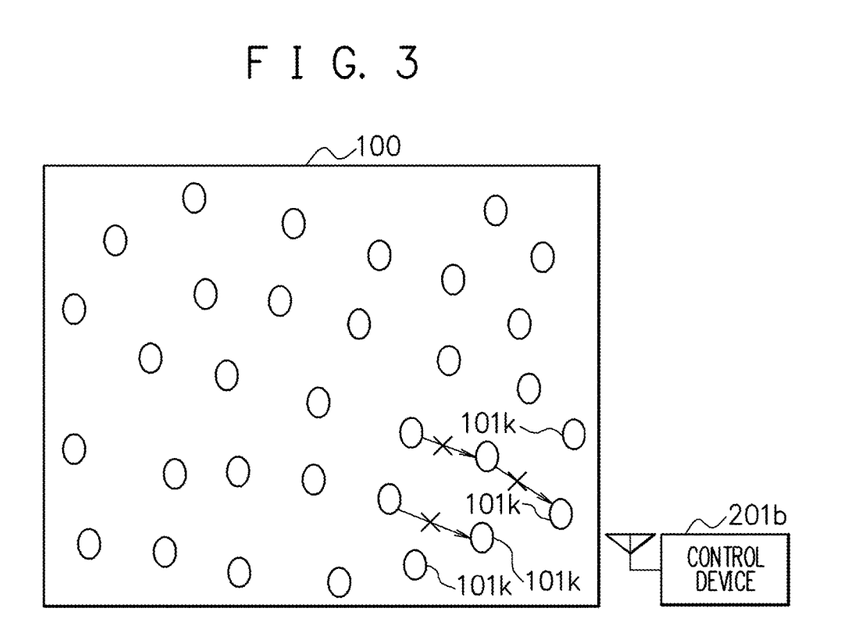
FIG. 3 is a diagram for explaining congestion of multihop communication.

FIG. 3 is a diagram for explaining congestion of multihop communication. When the communication device 101a transmits the same sensing data to the control device 201b via a plurality of different paths as in FIG. 2, the communication devices 101k nearest to the control device 201b are apt to bring about congestion of communication. In other words, since the communication devices 101k receive the sensing data from the communication devices 101 of the plurality of different paths from the communication device 101a being a transmission source, the communication devices 101k are apt to be subjected to high loads. When the communication devices 101k are subjected to the high loads, it becomes difficult for the communication devices 101k to perform transmission to the control device 201b, so that the multihop communication is congested. Therefore, it is necessary to reduce loads of the communication devices 101 near the control devices 201a to 201c, so as to prevent congestion of the multihop communication.

Figure 4:
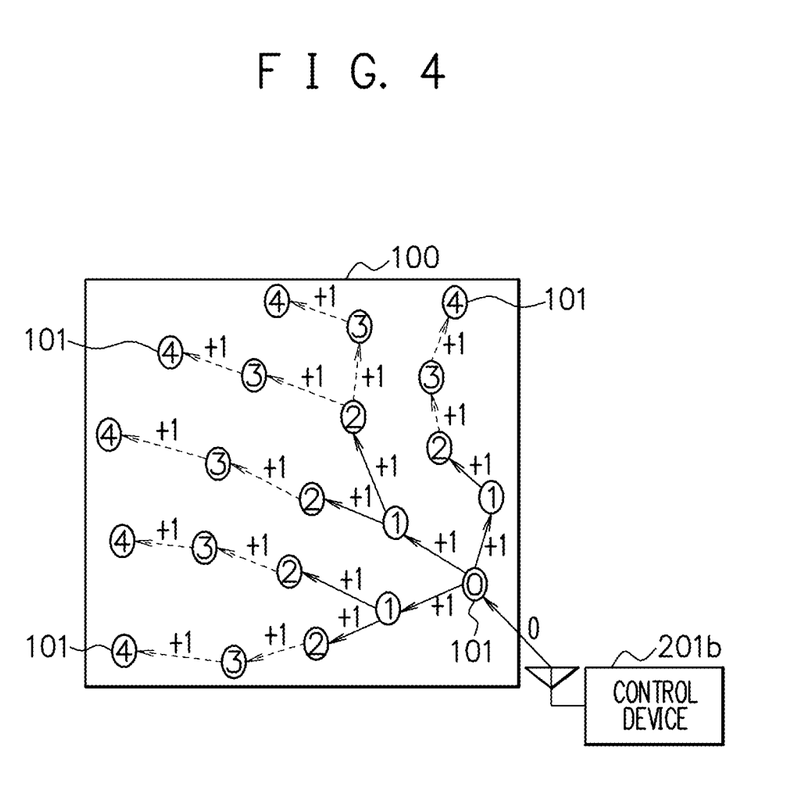
FIG. 4 is a diagram for exampling a detection method of a path length from a control device to a communication device.

FIG. 4 is a diagram for explaining a detection method of a path length from the control device 201b to the communication device 101. Hereinafter, an example of the control device 201b will be described, and a similar thing applies to the control devices 201a and 201c.

The control device 201b transmits a count signal of an initial value "0". The communication device 101 counts up (increments) and transmits a count signal received from the control device 201b directly or via another communication device 101, and stores a value of the received count signal. For example, the first communication device 101 nearest to the control device 201b receives the count signal of "0" from the control device 201b, increments the received count signal of "0", transmits a count signal of "1", and stores a value of the received count signal of "0". Next, the second communication device 101 receives the count signal of "1" from the first communication device 101, increments the received count signal of "1", transmits a count signal of "2", and stores a value of the received count signal of "1". A similar thing applies to another communication device 101. Thereby, each communication device 101 stores a value of a count signal corresponding to a path length from the control device 201b to the communication device 101 in question. The communication device 101 near to the control device 201b stores a value of a small count signal, and the communication device 101 far from the control device 201b stores a value of a large count signal.

For example, the communication device 101 storing the value of the count signal of "0" operates in a first operation mode. In the first operation mode, the communication device 101 is engaged exclusively in multihop communication. In other words, in the first operation mode, the communication device 101 does not perform transmission of the sensing data outputted by the sensor 112, but performs only transmission of the sensing data received from another communication device 101.

Further, the communication device 101 storing the value of the count signal of "2" or more operates in a third operation mode. In the third operation mode, the communication device 101 performs a normal operation. In other words, in the third operation mode, the communication device 101 performs both transmission of the sensing data outputted by the sensor 112 and transmission of the sensing data received from another communication device 101.

Further, the communication device 101 storing the value of the count signal of "1" operates in a second operation mode. In the second operation mode, the communication device 101 gives priority to the multihop communication. In other words, in the second operation mode, the communication device 101 performs both transmission of the sensing data outputted by the sensor 112 and transmission of the sensing data received from another communication device 101, and on that occasion, performs thinning-out of the transmission number of times of the sensing data outputted by the sensor 112 in transmission.

Note that though a case where the communication device 101 increments the count signal is described as an example in the above, the count signal may be decremented. Also in such a case, a first operation mode, a second operation mode, and a third operation mode are set in order from the communication device 101 nearest to the control device 201b.

The communication device 101 is set to the first operation mode when the path from the control device 201b to the communication device 101 in question corresponding to the stored value of the count signal is shorter than a first threshold value. Further, the communication device 101 is set to the second operation mode when the path from the control device 201b to the communication device 101 in question corresponding to the stored value of the count signal is longer than the first threshold value and shorter than a second threshold value. Further, the communication device 101 is set to the third operation mode when the path from the control device 201b to the communication device 101 in question corresponding to the stored value of the count signal is longer than the second threshold value.

In the first and second operation modes, the communication device 101 gives priority to transmission of the sensing data received from another communication device 101 over transmission of the sensing data outputted by the sensor 112.

As described above, the communication device 101 is set to the operation mode from first to third in correspondence with the stored value of the count signal and transmits the sensing data outputted from the senor 112 or transmits the sensing data received from another communication device 101. Thereby, with regard to the plurality of communication devices 101, the nearer the communication device 101 to the control device 201b, the smaller the transmission number of times of the sensing data outputted by the sensor 112 is, so that a load is reduced, and thus congestion of the multihop communication can be prevented.

Figure 5:
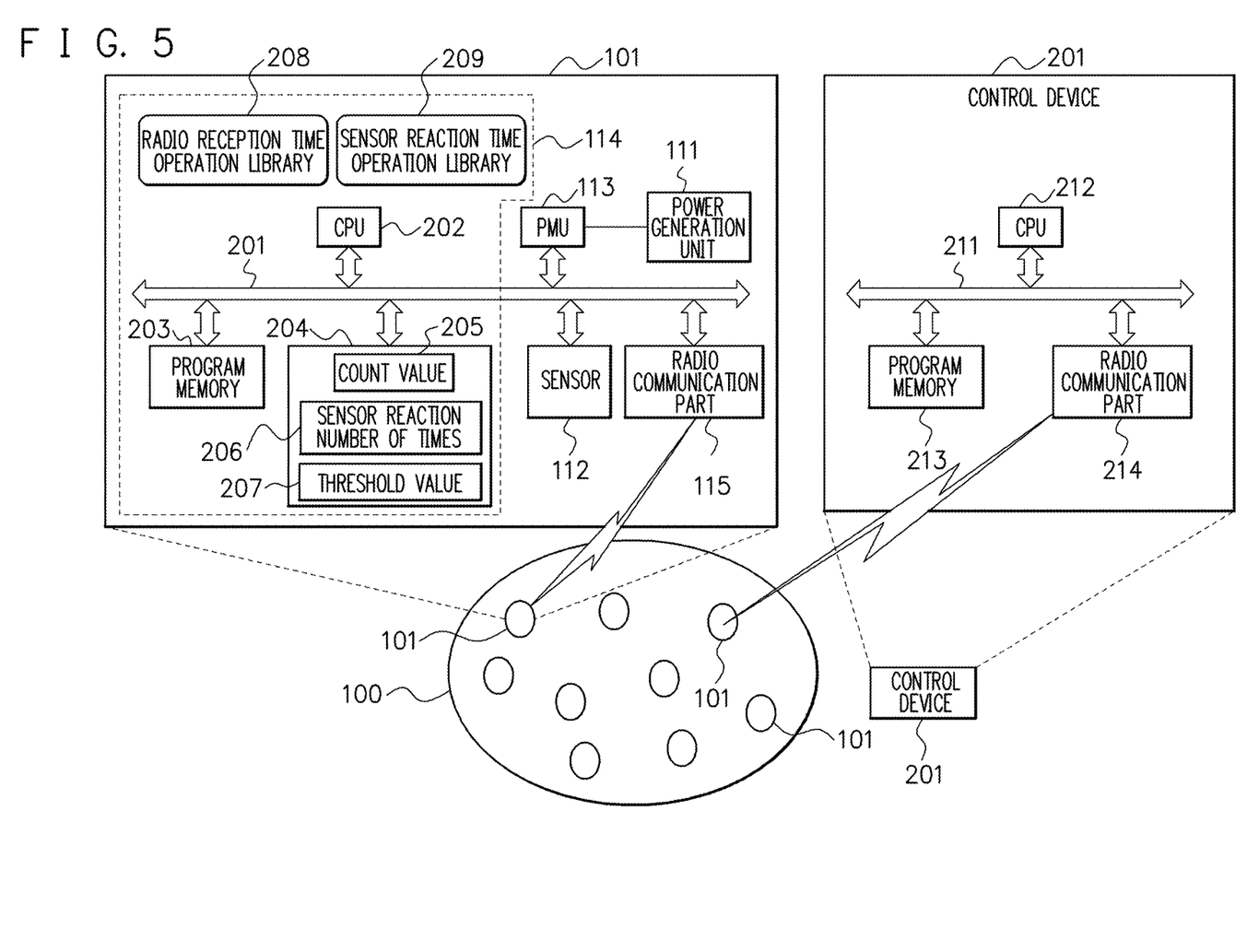
FIG. 5 is a diagram showing a configuration example of a communication device and a control device.

FIG. 5 is a diagram showing a configuration example of a communication device 101 and a control device 201. The control device 201 corresponds to the control devices 201a to 201c of FIG. 2.

The communication device 101, similarly to in FIG. 1, has a power generation unit 111, a sensor 112, a PMU 113, an MCU 114, and a radio communication part 115. The MCU 114 has a CPU (Central Processing Unit) 202, a program memory 203, and a nonvolatile memory 204. The nonvolatile memory 204 stores a count value 205, a sensor reaction number of times 206, and a threshold value 207. A radio reception time operation library 208 and a sensor reaction time operation library 209 are computer programs and are stored in the program memory 203. The power generation unit 111 is connected to the PMU 113. To a bus 201 are connected the CPU 202, the program memory 203, the nonvolatile memory 204, the sensor 112, the PMU 113, and the radio communication part 115. The CPU 202 performs a later-described processing of FIG. 6, by executing the radio reception time operation library 208. Further, the CPU 202 performs a later-described processing of FIG. 7, by executing the sensor reaction time operation library 209.

The nonvolatile memory 204 is address-mapped and can be directly accessed from the CPU 202. For example, the nonvolatile memory 204 is mapped in an address 1000 (hexadecimal numeral) or over. The count number 205 is stored in an address 1100 (hexadecimal numeral), the sensor reaction number of times 206 is stored in an address 1200 (hexadecimal numeral), and the threshold value 207 is stored in an address 1300 (hexadecimal numeral). Setting of "3 (decimal numeral)" as the count value 205 is materialized as a result that the CPU 202 executes an instruction to write "0000000000000011 (binary numeral)" into the address 1100 (hexadecimal numeral). Similarly, acquisition of the sensor reaction number of times 206 is materialized as a result that the CPU 202 executes an instruction to read a value of the address 1200 (hexadecimal numeral).

The control device 201 has a bus 211, a CPU 212, a program memory 213, and a radio communication part 214. To the bus 211 are connected the CPU 212, the program memory 213, and the radio communication part 214. The radio communication part 214 performs radio reception and radio transmission from/to the communication device 101 by control of the CPU 212. The CPU 212 performs a processing of the control device 201, by executing a program stored in the program memory 213.

Figure 6:
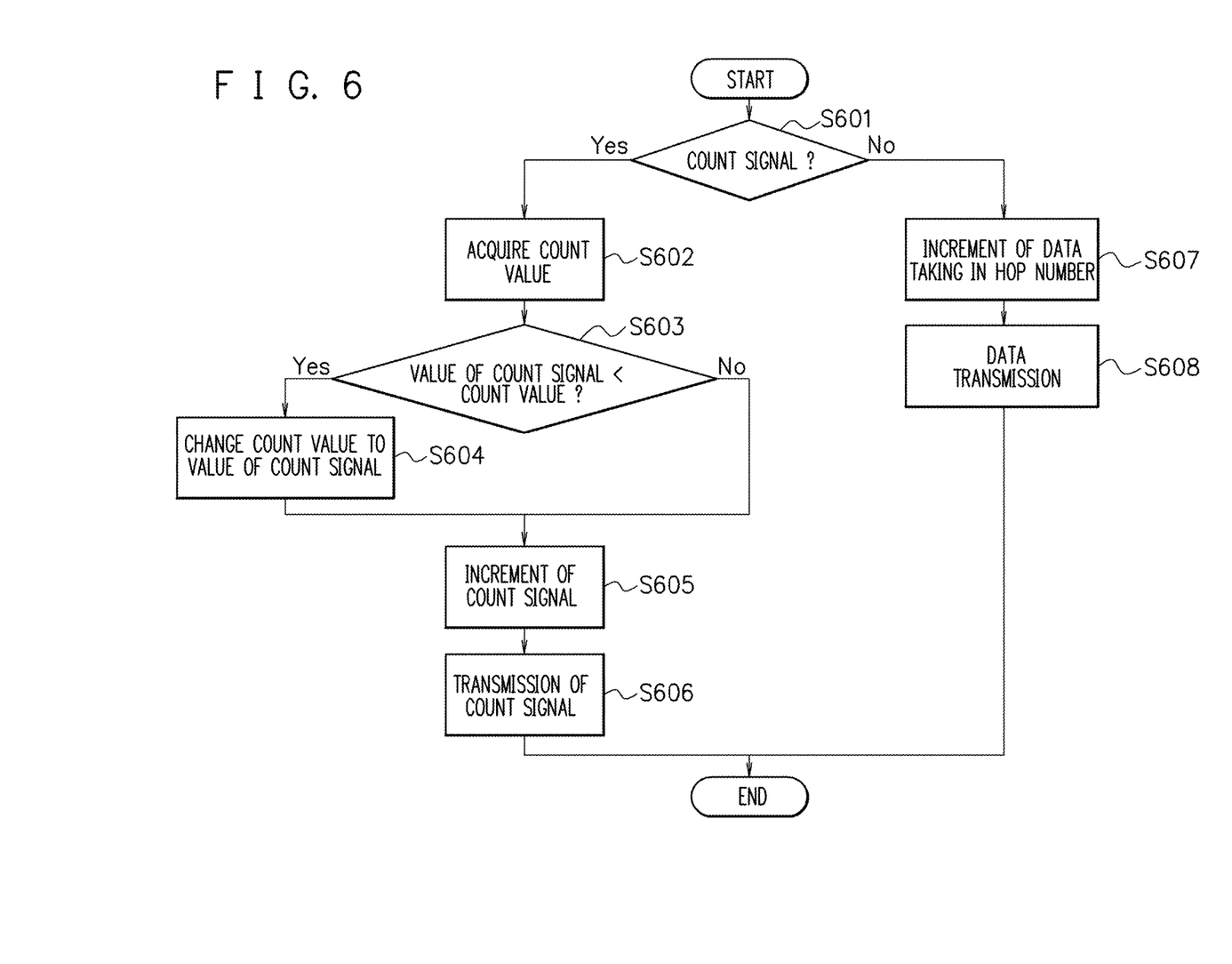
FIG. 6 is a flowchart showing a processing example performed as a result that a CPU of the communication device of FIG. 5 executes a radio reception time operation library.

FIG. 6 is a flowchart showing a processing example performed as a result that the CPU 202 of the communication device 101 of FIG. 5 executes the radio reception time operation library 208. The communication device 101 performs a processing below when the radio communication part 115 receives a radio signal from the outside.

The radio reception time operation library 208 is a program performed by the CPU 202 when the communication device 101 receives a radio signal. Concretely, the radio communication part 115, on receiving a radio signal, generates an interrupt signal to the CPU 202, to make control of the CPU 202 shift to an interrupt hander. The interrupt handler is executed by calling the radio reception time operation library 208 after a context is saved.

First, in a step S601, the CPU 202 checks whether or not a radio signal received via the radio communication part 115 is a count signal. The communication device 101 receives a count signal from the control device 201 directly or via another communication device 101, as shown in FIG. 4. Further, the communication device 101 receives sensing data (including a hop number) from another communication device 101, as shown in FIG. 2. When the received radio signal is a count signal, the communication device 101 proceeds to a processing of a step S602, and when the received radio signal is sensing data, the communication device 101 proceeds to a processing of a step S607.

For example, the CPU 202 reads reception data from a receiving buffer in the radio communication part 115 and judges whether the read data is a count signal. For example, it is possible that an address is mapped in the receiving buffer and that the CPU 202 executes an instruction to read to that address, and it is possible that the CPU 202 executes a dedicated instruction to read data of the receiving buffer. Further, with a most significant bit of the communication data being used as an identifier for judgment of a "count signal" or not, judgment of being a "count signal" is made when the most significant bit is "1".

In the step S602, the CPU 202 acquires the count value 205 from the nonvolatile memory 204. An initial value of the count value 205 is a maximum value of "1111" (binary numeral), for example.

Next, in a step S603, the CPU 202 checks whether or not a value of the count signal received in the step S601 is smaller than the count value 205 acquired in the step S602. Concretely, an instruction to read the count value 205 of the address 1100 (hexadecimal numeral), for example, is executed, and an instruction to compare registers with each other is executed. Since the initial value of the count value 201 is the maximum value, the value of the count signal is smaller than the count value 205 for a first time. The communication device 101 proceeds to a processing of a step S604 when the value of the count signal is smaller than the count value 205, and proceeds to a processing of a step S605 when the value of the count signal is equal to or more than the count value 205.

In the step S604, the CPU 202 changes the count value 205 in the nonvolatile memory 204 to the value of the above-described received count signal. Thereafter, the communication device 101 proceeds to the processing of the step S605.

In the step S605, the CPU 202 increments the value of the above-described received count signal.

Next, in a step S606, the radio communication part (count signal communication part) 115 radio-transmits the incremented value of the count signal described above, by an instruction of the CPU 202. Concretely, the CPU 202 writes the value of the count signal and the identifier indicating being the count signal into a transmitting buffer of the radio communication part 115, and transmits the above. Then, the communication device 101 terminates the processing of the radio reception time operation library 208.

In the step S607, the CPU 202 takes in the received sensing data and hop number described above and increments the hop number.

Next, in a step S608, as shown in FIG. 8, the radio communication part 115 radio-transmits the received sensing data 801 and the incremented hop number 802 described above, by an instruction of the CPU 202. For example, the CPU 202 writes the sensing data and the hop number into the transmitting buffer in the radio communication part 115, and transmits the above. Similarly to in the above-described receiving buffer, it is possible to map an address in the transmitting buffer and it is also possible to execute a dedicated instruction to write. Thereby, multihop communication is performed. Then, the communication device 101 terminates the processing of the radio reception time operation library 208.

When the control device 201 transmits a count signal, the communication device 101 sometimes receives count signals from a plurality of other communication devices via a plurality of paths from the control device 201. In such a case, the communication device 101 receives the plurality of count signals from the plurality of other communication devices 101. A value of the count signal received first is written into the nonvolatile memory 204 as the count value 205 in the step S604. With regard to a value of the count signal received for a second time or more, the value is updated as the count value 205 in the nonvolatile memory 204, only when the value of the count signal is smaller than the count value 205 in the nonvolatile memory 204 in the step S603. In other words, when the communication device 101 receives the plurality of count signals, the communication device 101 writes a smallest value among the plurality of count signals into the nonvolatile memory 204 as the count value 205. In other words, when receiving the plurality of count signals, the communication device 101 stores a value of the count signal received through a shortest path from the control device 201 among the plurality of count signals as the count value 205. Consequently, the count value 205 in the nonvolatile memory 204 becomes the value of the count signal passing through the shortest path from the control device 201 to the communication device 101 in question.

Figure 7:
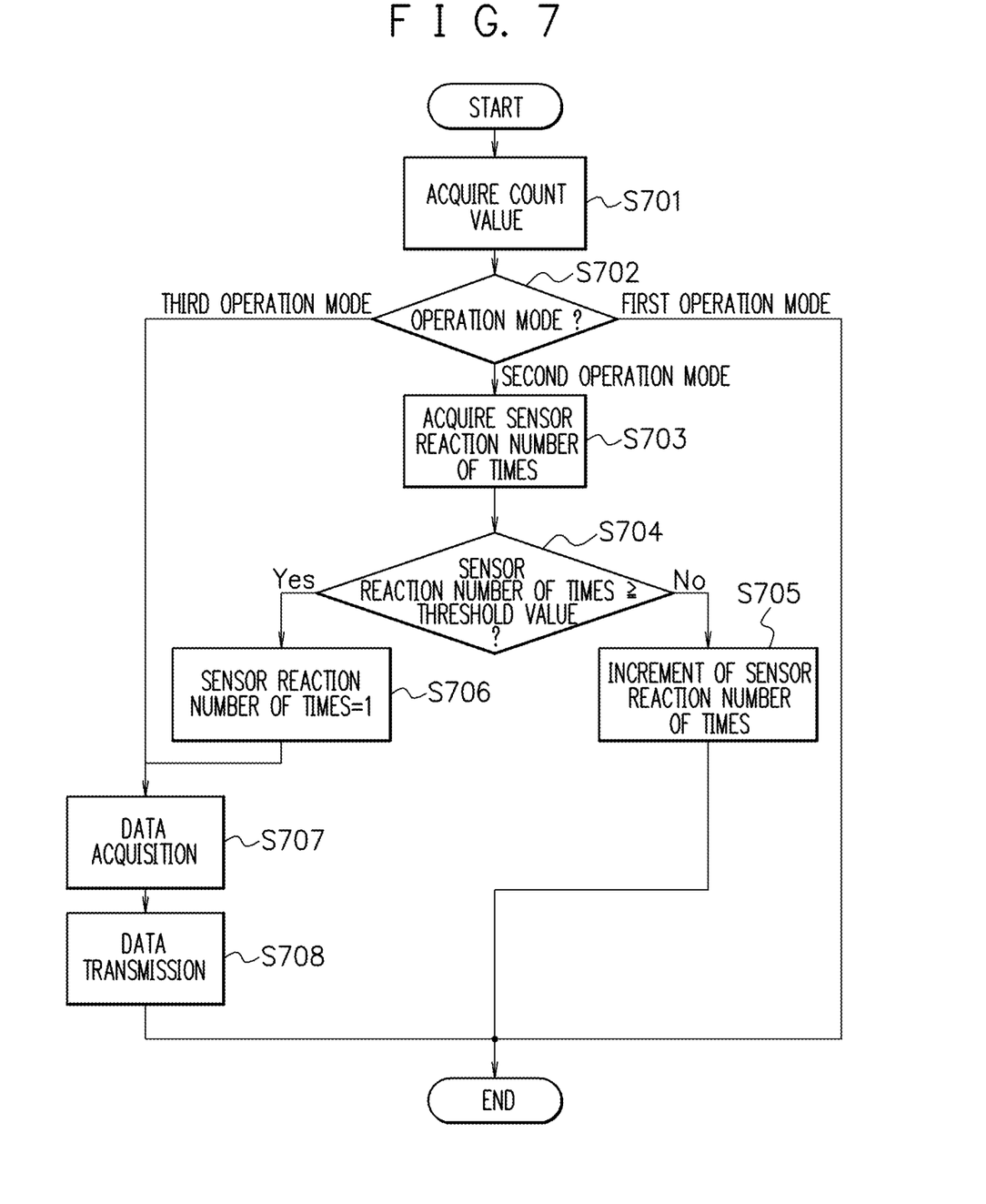
FIG. 7 is a flowchart showing a processing example performed as a result that the CPU of the communication device of FIG. 5 executes a sensor reaction time operation library.

FIG. 7 is a flowchart showing a processing example performed as a result that the CPU 202 of the communication device 101 of FIG. 5 executes the sensor reaction time operation library 209. The communication device 101 performs a processing below when a variation amount of the sensing data of the sensor 112 becomes equal to or more than a threshold value, for example.

The sensor reaction time operation library 209 is a program executed by the CPU 202 when the sensor 112 reacts. Concretely, when detecting a specific state in an environment, the sensor 112 generates an interrupt signal to the CPU 202, to make control of the CPU 202 shift to an interrupt handler. The interrupt handler is executed by calling the sensor reaction time operation library 209, after a context is saved.

First, in a step S701, the CPU 202 acquires the count value 205 in the nonvolatile memory 204. The count value 205 in the nonvolatile memory 204 is already set by the above-described processing of FIG. 6.

Next, in a step S702, when the count value 205 is "0", which means being in the first operation mode, the CPU 202 terminates the processing, when the count value 205 is "1", which means being in the second operation mode, the CPU 202 proceeds to a processing of a step S703, and when the count value 205 is equal to or more than "2", which means being in the third operation mode, the CPU 202 proceeds to a processing of a step S707.

The first operation mode is an operation mode in which multihop communication is exclusively performed. The second operation mode is an operation mode in which priority is given to multihop communication. The third operation mode is an operation mode in which both multihop communication and transmission of the sensing data of the sensor 112 are performed.

In a step S703, the CPU 202 acquires the sensor reaction number of times 206 in the nonvolatile memory 204. An initial value of the sensor reaction number 206 is "1", for example.

Next, in a step S704, the CPU 202 checks whether or not the above-described sensor reaction number of times 206 is equal to or more than the threshold value 207 in the nonvolatile memory 204. Concretely, the CPU 202 executes a read instruction of the sensor reaction number of times 206 of the address 1200 (hexadecimal numeral) and the threshold value 207 of the address 1300 (hexadecimal numeral) and performs comparison. The threshold value 207 is "5" or "10", for example. When the threshold vale 207 is "5", an initial value of the sensor reaction number of times 206 being "1", the sensor reaction number of times 206 is smaller than the threshold value 207 for a first time. When the sensor reaction number of times 206 is smaller than the threshold value 207, the communication device 101 proceeds to a processing of a step S705, and when the sensor reaction number of times 206 is equal to or larger than the threshold value 207, the communication device proceeds to a processing of a step S706.

In the step S705, the CPU 202 increments the sensor reaction number of times 206 in the nonvolatile memory 204 and terminates the processing.

In the step S706, the CPU 202 resets the sensor reaction number of times 206 in the nonvolatile memory 204 to "1" and proceeds to a processing of a step S707.

In the step S707, the CPU 202 takes in sensing data from a buffer of the sensor 112.

Next, in a step S708, the radio communication part (data communication part) 115, as shown in FIG. 8, radio-transmits sensing data 801 of the above-described sensor 112 and a hop number 802 of an initial value "0", by an instruction of the CPU 202. Concretely, the CPU 202 writes the sensing data, an identifier indicating not being a count signal, and the hop number into the transmitting buffer of the radio communication part 115 and performs transmission. Then, the communication device 101 terminates the processing of the sensor reaction time operation library 209.

There will be described a case where the threshold value 207 is "5" for example in the second operation mode. In the step S704, the process proceeds to the step S705 for a first to fourth time, and the process proceeds to the step S706 for a fifth time. Consequently, the sensing data of the sensor 112 is transmitted once every five times of sensor reaction, in the step S708. Thereby, it is possible to perform thinning-out of the transmission number of times of the sensing data outputted from the sensor 112 in transmission.

As described above, in the first operation mode, the communication device 101 does not perform transmission of the sensing data outputted by the sensor 112 (step S708) but performs transmission of the sensing data received from another communication device 101 (step S608).

In the second operation mode, the communication device 101 performs both transmission of the sensing data outputted by the sensor 112 (step S708) and transmission of the sensing data received from another communication device 101 (step S608), and on that occasion, performs thinning-out of the transmission number of times of the sensing data outputted by the sensor 112 in transmission.

In the third operation mode, the communication device 101 performs both transmission of the sensing data outputted by the sensor 112 (step S708) and transmission of the sensing data received from another communication device 101 (step S608), and on that occasion, does not perform thinning-out of the transmission number of times of the sensing data outputted by the sensor 112.

According to the present embodiment, even if coordinate positions of the plurality of communication devices are unknown, the count value 205 is set in each communication device 101 by transmission of the count signal by the control device 201, so that the path length from the control device 201 to each communication device 101 can be specified. With regard to the plurality of communication devices 101, the nearer to the control device 201 the communication device 101 is, the fewer the transmission number of times of the sensing data outputted by the sensor 112 is, so that a load is reduced, and thus congestion of multihop communication can be prevented.

The present embodiment can be materialized as a result that a computer executes a program. Further, it is possible to apply a computer-readable storage medium storing the above-described program as well as a computer program product such as the above-described program as an embodiment of the present invention. As the storage medium, it is possible to use, for example, a flexible disk, a hard disk, an optical disk, a magnetic optical disk, a CD-ROM, a magnetic tape, a nonvolatile memory card, a ROM, and so on.

The embodiments of the present invention described hereinabove are presented by way of examples only to realize the present invention, and are not intended to limit the scope of the invention. Indeed, the present invention can be implemented in a variety of forms without departing from the technical spirit or essential features of the invention.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

Congestion of communication can be prevented.

The invention claimed is:

1. A communication device, comprising:
   a sensor configured to output sensing data;
   a communication circuit configured to
   count a count signal received from a control device directly or via
   another communication device and transmit the counted count signal and to store a value of the received count signal; and
   transmit the sensing data outputted by the sensor or the sensing data received from the another communication device, in correspondence with the stored value of the count signal, wherein when the stored value of the count signal is smaller than a threshold value set in advance, the communication of circuit is configured to transmit, with high priority, the sensing data received from another communication device instead of transmission of sensing data outputted by the sensor.

2. The communication device according to claim 1, wherein, the communication circuit is configured to store, when receiving a plurality of the count signals, a minimum value among values of the plurality of count signals.

3. A communication device, comprising:
   a sensor configured to output sensing data;
   a communication circuit configured to
   count a count signal received from a control device directly or via
   another communication device and transmit the counted count signal and to store a value of the received count signal; and
   transmit the sensing data outputted by the sensor or the sensing data received from the another communication device, in correspondence with the stored value of the count signal, wherein when the stored value of the count signal is smaller than a first threshold value set in advance, the communication circuit is configured to not perform transmission of the sensing data outputted from the sensor but transmit the sensing data received from the another communication device, and
   when the stored value of the count signal is larger than a second threshold value set in advance, the communication circuit is configured to transmit one of: the sensing data outputted by the sensor and the sensing data received from the another communication device.

4. The communication device according to claim 3, wherein, when the stored value of the count signal is larger than the first threshold value and smaller than the second threshold value, the communication circuit is configured to transmit the sensing data outputted from the sensor or the sensing data received from the another communication device, and on that occasion, perform thinning-out of a transmission number of times of the sensing data outputted by the sensor and transmits the sensing data.

5. A communication system, comprising:
   a plurality of communication devices; and
   a control device,
   wherein each of the plurality of communication devices comprises:
   a sensor configured to output sensing data;
   a communication circuit configured to
   count a count signal received from the control device directly or via another communication device and transmit the counted count signal and to store a value of the received count signal; and
   transmit the sensing data outputted by the sensor or the sensing data received from another communication device, in correspondence with the stored value of the count signal, wherein
   when the stored value of the count signal is smaller than a threshold value set in advance, the communication circuit is configured to transmit, with high priority, the sensing data received from the another communication device instead of transmission of sensing data outputted by the sensor.

6. A control method of a communication device which has a sensor outputting sensing data, the method comprising:
   counting a count signal received from a control device directly or via another communication device to transmit the counted count signal and storing a value of the received count signal; and
   when the stored value of the count signal is smaller than a threshold value set in advance, transmitting, with high priority, the sensing data received from the another communication device instead of transmission of sensing data outputted by the sensor.

* * * * *